US010003952B2

(12) United States Patent
Sorrentino et al.

(10) Patent No.: US 10,003,952 B2
(45) Date of Patent: Jun. 19, 2018

(54) DEVICE TO-DEVICE (D2D) DISCOVERY

(71) Applicant: TELEFONAKTIEBOLAGET L M ERICSSON (PUBL), Stockholm (SE)

(72) Inventors: Stefano Sorrentino, Solna (SE); Qianxi Lu, Beijing (CN); Zhenshan Zhao, Beijing (CN); Qingyu Miao, Beijing (CN)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 231 days.

(21) Appl. No.: 14/890,380

(22) PCT Filed: May 7, 2014

(86) PCT No.: PCT/IB2014/061273
§ 371 (c)(1),
(2) Date: Nov. 10, 2015

(87) PCT Pub. No.: WO2014/181272
PCT Pub. Date: Nov. 13, 2014

(65) Prior Publication Data
US 2016/0112860 A1    Apr. 21, 2016

(30) Foreign Application Priority Data

May 10, 2013 (WO) ................ PCT/CN2013/075480

(51) Int. Cl.
*H04W 8/00* (2009.01)
*H04L 5/00* (2006.01)
(Continued)

(52) U.S. Cl.
CPC ............. *H04W 8/005* (2013.01); *H04L 5/006* (2013.01); *H04L 69/323* (2013.01); *H04L 69/324* (2013.01); *H04W 76/023* (2013.01)

(58) Field of Classification Search
None
See application file for complete search history.

(56) References Cited

U.S. PATENT DOCUMENTS 8,005,108 B1    8/2011 Broad
8,275,314 B1    9/2012 Lin
(Continued)

OTHER PUBLICATIONS

P-U Tournoux, et al.; "The Accordian Phenomenon: Analysis, Characterization, and Impact on DTN Routing;" Infocom 2009; 28th Conference on Computer Communications; IEEE, Piscataway, NJ, USA; Apr. 19, 2009.
(Continued)

*Primary Examiner* — Huy D Vu
*Assistant Examiner* — Hong Shao

(57) ABSTRACT

A method of operating a first wireless communication device to perform D2D discovery includes obtaining multiple discovery message detection results, and determining a D2D discovery status of a second wireless communication device based on the multiple discovery message detection results. Using multiple discovery message detection results to determine the D2D discovery status of the second wireless communication device significantly increases the reliability of D2D discovery, thereby increasing the likelihood that a device available for D2D communication will be detected, while reducing the likelihood of false detections.

13 Claims, 7 Drawing Sheets

(51) Int. Cl.
    *H04L 29/08*    (2006.01)
    *H04W 76/02*    (2009.01)

(56) References Cited

U.S. PATENT DOCUMENTS

| | | | |
|---|---|---|---|
| 2007/0090919 A1 | 4/2007 | Desai | |
| 2010/0330910 A1 | 12/2010 | Yan | |
| 2014/0029596 A1* | 1/2014 | Li | H04W 8/005 370/338 |
| 2014/0057667 A1* | 2/2014 | Blankenship | H04L 67/303 455/500 |

OTHER PUBLICATIONS

Research in Motion UK Limited: "Scenarios and Evaluation of Proximity Services Under Network Coverage," 3GPP Draft; R1-131350 Rim Proximity Services Scenarios and Evaluation, 3rd Generation Partnership Project (3GPP); vol. RAN WG1, Chicago, IL, USA; Apr. 6, 2013.

Secretary of SA WG2: "Draft Report of SA WG2 meetings #101," 3GPP Draft; S2-140574_S2_101_Draft_Rep_V009RM, 3rd Generation Partnership Project (3GPP);vol. SA WG2, San Jose del Cabo, Mexico; Jan. 20, 2014.

Huawei, et al.: "Options for Discovery Message Format and Identifiers," 3GPP Draft; R2-134403; Options for Discovery Message Format and Identifiers, 3rd Generation Partnership Project (3GPP), vol. RAN WG2, San Francisco, CA, USA; Nov. 2, 2013.

* cited by examiner

DEVICE TO-DEVICE (D2D) DISCOVERY

RELATED APPLICATIONS

This application is a National Phase Entry of PCT/IB2014/061273, filed May 7, 2014, which claims the benefit of PCT/CN2013/075480, filed May 10, 2013, the disclosures of which are fully incorporated herein by reference.

FIELD OF THE DISCLOSURE

The present disclosure relates to the reliable discovery of D2D wireless communication devices in a cellular communications network.

BACKGROUND

As cellular communication technologies continue to evolve, a heavy emphasis has been placed on conserving network resources, enhancing reliability, and increasing data rates. One way to conserve network resources, while simultaneously enhancing reliability and increasing data rates, is through the use of device-to-device (D2D) communication. D2D communication allows wireless communication devices in close proximity to one another to communicate directly, rather than by routing traffic between the devices through one or more cellular access points (e.g., evolved Node Bs (eNBs)). Using D2D communication reduces traffic to one or more cellular access points in a wireless communication network, and can improve the performance of data transfer between wireless communication devices.

D2D communication enables a number of potential gains over traditional cellular routing techniques. First, radio resources between the resource layer on which D2D communication occurs and the resource layer on which cellular communication occurs can be shared. That is, a wireless communication device may simultaneously utilize a D2D connection and a cellular connection, thereby enhancing data rates of the wireless communication device. Additionally, wireless communication devices using D2D will experience a hop gain, due to the fact that one or more cellular access points are not required for routing data between the devices. Further gains may be achieved due to favorable propagation conditions between wireless communication devices due to the proximity of the devices, which may allow for high peak data rates. Finally, end-to-end latency may decrease between wireless communication devices using D2D communication, due to the short-cutting of cellular access point routing and thus the forwarding time of data between the devices.

In most D2D communication systems, D2D discovery is the first step in the establishment of a D2D communication link. Generally, D2D discovery is made possible by the transmission and receipt of discovery messages, or beacons, between wireless communication devices. In conventional D2D communication systems, a broadcasting wireless communication device will transmit a discovery message, which may be received by a discovering wireless communication device. Generally, the broadcasting wireless communication device is considered "discovered" (i.e., the D2D discovery status of the broadcasting wireless communication device is determined as positive) according to conventional D2D communication systems once a single discovery message is detected at a lower layer of the protocol stack of the discovering wireless communication device (i.e., Layer 1). The discovering wireless communication device may then choose to initiate a D2D wireless communication link with the broadcasting wireless communication device.

While generally effective for stationary wireless communication devices, the foregoing device discovery process produces significant errors when used with mobile wireless communication devices. First, when used by mobile wireless communication devices, the D2D device discovery process described above results in a high probability of false detections due to the fact that the broadcasting wireless communication device may have moved out of range of the detecting wireless communication device shortly after receipt of the discovery message. Accordingly, if the detecting wireless communication device should attempt to initiate a D2D wireless communication link with the broadcasting wireless communication device, the D2D wireless communication link would fail. Second, discovery messages broadcast from a mobile wireless communication device may fail to be detected altogether due to the large variance in discovery message characteristics caused by changes to the location and/or orientation of the broadcasting wireless communication device.

Accordingly, there is a need for a reliable D2D discovery method capable of improving detection of D2D wireless communication devices in a cellular communications network.

SUMMARY

Systems and methods related to the reliable discovery of D2D wireless communication devices in a wireless communications network are disclosed. In one embodiment, a method of operating a first wireless communication device to perform D2D discovery includes obtaining multiple discovery message detection results, and determining a D2D discovery status of a second wireless communication device based on the multiple discovery message detection results. Using multiple discovery message detection results to determine the D2D discovery status of the second wireless communication device significantly increases the reliability of D21) discovery, thereby increasing the likelihood that a D2D wireless communication device will be detected, while reducing the likelihood of false detections.

In one embodiment, the multiple discovery message detection results are obtained at a first layer within a protocol stack of the first wireless device, while the D2D discovery status is determined at a second layer within the protocol stack of the first wireless communication device. The second layer is a higher layer than the first layer in the protocol stack of the first wireless device. In one embodiment, the first layer is an L1 layer, and the second layer is an L2 layer or a media access control layer.

In one embodiment, an event indicating the discovery of the second wireless communication device may be reported to a third layer within the protocol stack of the first wireless communication stack. The third layer may be a higher layer than the first layer and the second layer, such as, for example, an application layer of the protocol stack of the first wireless device.

In one embodiment, determining the D2D discovery status of the second wireless communication device involves determining if a minimum number of discovery messages from the second wireless communication device were detected by the first wireless communication device in a predefined time period.

In one embodiment, a method of operating a first wireless communication device to perform D2D discovery includes obtaining multiple discovery message detection results, obtaining one or more signal strength measurement values, and determining a D2D discovery status of a second wireless communication device based on one or more of the multiple discovery message detection results and the one or more signal strength measurement values. Each of the one or more signal strength measurement values may be associated with a different one of the multiple discovery message detection results. Using one or more discovery message detection results together with one or more signal strength measurement values to determine the D2D discovery status of the second wireless communication device significantly increases the reliability of D2D discovery, thereby increasing the likelihood that a D2D wireless communication device will be detected, while reducing the likelihood of false detections.

In one embodiment, determining the D2D discovery status of the second wireless communication device involves determining if the one or more signal strength measurements are above a minimum threshold. Determining the D2D discovery status of the second wireless communication device may further involve determining if a minimum number of discovery messages from the second wireless communication device were detected by the first wireless communication device in a predefined time period.

In one embodiment, the method of operating the first wireless communication device to perform D2D discovery further includes obtaining one or more total received power measurement values, each associated with a different one of the multiple discovery message detection results. Determining the D2D discovery status of the second wireless communication device may be further based on the one or more total received power measurement values.

In one embodiment, determining the D2D discovery status of the second wireless communication device involves determining if the one or more signal strength measurement values over the one or more total received power measurement values are above a minimum threshold.

In one embodiment, a first wireless communication device includes a wireless transceiver, a processor, and a memory. The memory contains instructions that are executable by the processor whereby the first wireless communication device is configured to obtain multiple discovery message detection results from the wireless transceiver, and determine a D2D discovery status of a second wireless communication device based on the multiple discovery message detection results. Using multiple discovery message detection results to determine the D2D discovery status of the second wireless communication device significantly increases the reliability of D2D discovery, thereby increasing the likelihood that a device available for D2D communication will be detected, while reducing the likelihood of false detections.

In one embodiment, determining the D2D discovery status of the second wireless communication device involves determining if a minimum number of discovery messages from the second wireless communication device were detected by the first wireless communication device in a predefined time period.

In one embodiment, a first wireless communication device includes a wireless transceiver, a processor, and a memory. The memory contains instructions that are executable by the processor whereby the first wireless communication device is configured to obtain multiple discovery message detection results from the wireless transceiver, and determine a D2D discovery status of a second wireless communication device based on one or more of the multiple discovery message detection results and the one or more signal strength measurement values. Using one or more discovery message detection results together with one or more signal strength measurement values to determine the D2D discovery status of the second wireless communication device significantly increases the reliability of D2D detection, thereby increasing the likelihood that a D2D wireless communication device will be detected, while reducing the likelihood of false detections.

In one embodiment, determining the D2D discovery status of the second wireless communication device involves determining if the one or more signal strength measurements are above a minimum threshold. Determining the D2D discovery status of the second wireless communication device may further involve determining if a minimum number of discovery messages from the second wireless communication device were detected by the first wireless communication device in a predefined time period.

In one embodiment, the method of operating the first wireless communication device to perform D2D discovery further includes obtaining one or more total received power measurement values, each associated with a different one of the multiple discovery message detection results. Determining the D2D discovery status of the second wireless communication device may be further based on the one or more total received power measurement values.

In one embodiment, determining the D2D discovery status of the second wireless communication device involves determining if the one or more signal strength measurement values over the one or more total received power measurement values are above a minimum threshold.

Those skilled in the art will appreciate the scope of the present disclosure and realize additional aspects thereof after reading the following detailed description of the embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
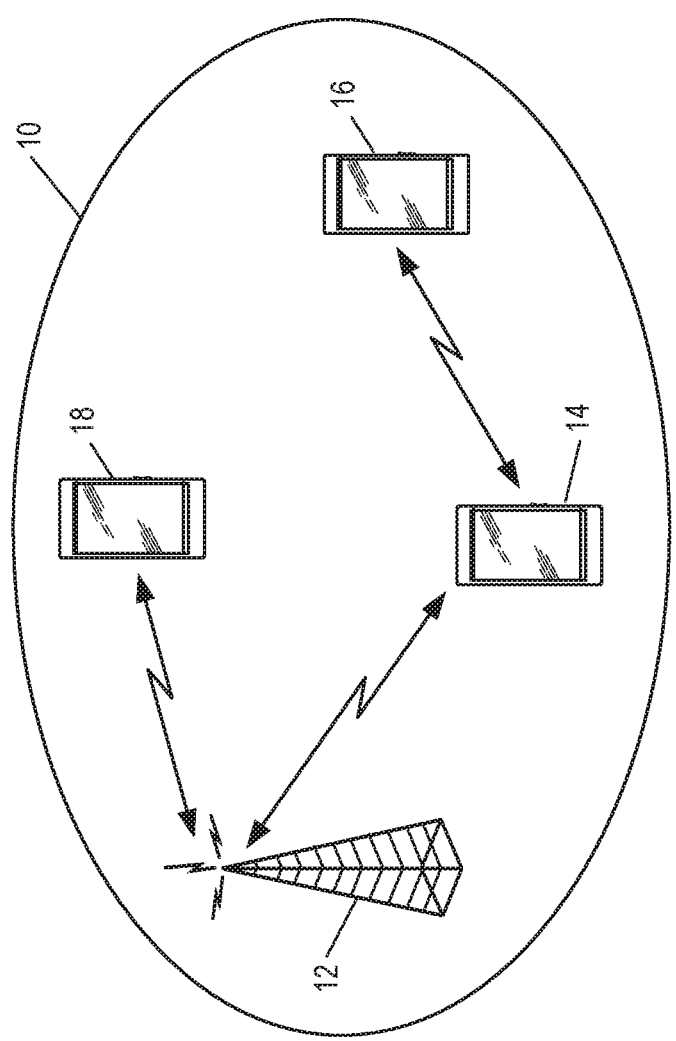
FIG. 1 illustrates a cellular communications network in which device-to-device (D2D) communication is available according to one embodiment of the present disclosure.

Systems and methods are disclosed for reliable discovery of D2D wireless communication devices in a cellular communications network. In this regard, FIG. 1 illustrates a wireless communication network 10 including base station 12, a first wireless communication device 14, a second wireless communication device 16, and a third wireless communication device 18. In some embodiments, the cellular communications network 10 is a $3^{rd}$ Generation Partnership Projection (3GPP) Long Term Evolution (LTE) network, in which case the base station 12 may be, e.g., an evolved Node B (eNB) or other radio access point, or node, of the LTE network. However, the present disclosure is not limited to an LTE network.

As shown in FIG. 1, the first wireless communication device 14 is engaged in direct D2D communication with the second wireless communication device 16, while the third wireless communication device 18 is engaged in communication with the first wireless communication device 14 through the base station 12. Although not shown, any number of wireless communication devices may be present in the wireless communication network 10, and may communicate with one another indirectly through, e.g., the cellular communications network 10 or directly using D2D communication. Generally, when wireless communication devices in the wireless communication network 10 are close enough in physical proximity to one another (e.g., 10-100 meters from one another), D2D communication is utilized. Otherwise, the wireless communication devices will communicate to one another through the cellular communications network 10 (e.g., through the base station 12). As discussed above, D2D conserves network resources provided by the base station 12, while simultaneously enhancing reliability and data rates between wireless communication devices connected via a D2D communication link.

Figure 2:
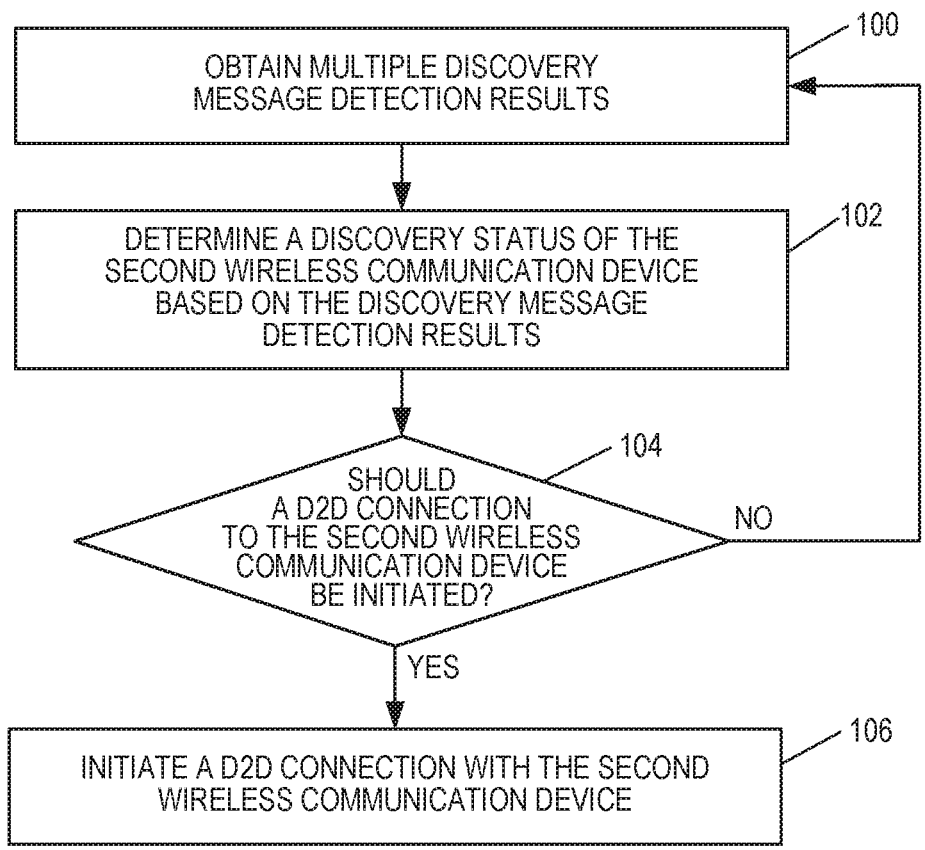
FIG. 2 illustrates a method for reliable discovery of wireless communication devices available for D2D communication according to one embodiment of the present disclosure.

In order to determine when one or more wireless communication devices in the wireless communication network 10 should utilize D2D communication, the wireless communication devices must perform D2D discovery. In this regard, FIG. 2 illustrates a method for performing reliable D2D discovery between wireless communication devices according to one embodiment of the present disclosure. For purposes of illustration, the various steps of the process illustrated in FIG. 2 are discussed as they relate to the first wireless communication device 14 and the second wireless communication device 16 shown in FIG. 1. Those of ordinary skill in the art will appreciate that the method illustrated in FIG. 2 may be performed by any number of different wireless communication devices without departing from the principles herein.

First, multiple discovery message detection results are obtained by the first wireless communication device 14 (step 100). In some embodiments, the discovery message detection results are obtained in an L1 layer (e.g., a physical layer) in the protocol stack of the first wireless communication device 14, as discussed in further detail below. Each discovery message detection result indicates whether a discovery message from another wireless communication device has been detected at a corresponding point in time. Note that the discovery messages may alternatively be referred to as beacons. In general, a discovery message will be detected when a discovery message is transmitted by another wireless communication device that is in close physical proximity to the first wireless communication device 14. For example, the discovery message detection results may indicate that one or more discovery messages from the second wireless communication device 16 were detected by the first wireless communication device 14 during a corresponding time window, or time period. In one embodiment, each one of the discovery message detection results is either positive or negative, where a positive discovery message detection result indicates that a discovery message from the second wireless communication device 16 was detected by the first wireless communication device 14 and a negative discovery detection result indicates that a discovery message from the second wireless communication device was not detected by the first wireless communication device 14.

As discussed above, conventional D2D communication systems generally consider a wireless communication device "discovered", thus having a positive D2D discovery status, upon the detection of a single discovery message, resulting in a large number of false detections of nearby D2D wireless communication devices, particularly when the first wireless communication device 14 and/or the other nearby wireless communication devices are mobile. In order to more reliably discover nearby D2D wireless communication devices, the first wireless communication device 14 post-processes the multiple discovery message detection results obtained in step 100 in order to determine a D2D discovery status of the second wireless communication device 16 (step 102). The D2D discovery status of the second wireless communication device 16 may indicate that the second wireless communication device 16 is in close proximity to the first wireless communication device 14, and may further indicate availability of the second wireless communication device 16 for D2D communication with the first wireless communication device 14. In one embodiment, the determination of the D2D discovery status occurs on a layer in the protocol stack of the first wireless device 14 that is higher than the layer of the protocol stack in which the discovery message detection results were obtained. For example, in one embodiment, the determination of the D2D discovery status occurs in an L2 layer or a media access control layer of the first wireless communication device 14, as discussed in further detail below. Further, the D2D discovery status may be reported as an event to an even higher layer in the protocol stack of the first wireless communication device 14 such as, for example, an application layer, as discussed in further detail below. Using multiple discovery message detection results to determine the D2D discovery status of the second wireless communication device 16 allows the first wireless communication device 14 to more reliably ascertain the D2D discovery status of the second wireless communication device 16, as discussed in further detail.

In one embodiment, after obtaining the discovery message detection results (e.g., in L1), the discovery message detection results are post-processed (e.g., in L2 or MAC layer, in L3 or RRC layer, or some other higher layer) to determine if a minimum number of discovery messages from the second wireless communication device 16 were detected by the first wireless communication device 14 in a predetermined period of time, as shown in Equation (1) below:

$$D(t)=D\_L1(t-W)+D\_L1(t-W+1)+\ldots+D\_L1(t)>=N \quad (1)$$

where D(t) is the D2D discovery status of the second wireless communication device 16, D_L1 is a discovery message detection result (i.e., 1 or 0 according to whether the discovery message is detected or not), t is the current time, W is the predetermined period of time (or time window), and N is the desired minimum number of positive discovery message detection results that should occur before indicating a positive D2D discovery status. As shown in Equation (1), if the number of positive discovery message detection results D_L1 is greater than the desired minimum number of positive discovery message detection results N within the predetermined period of time W the D2D discovery status of the second wireless communication device 16 is positive, which may indicate that the second wireless communication device 16 is in close proximity to the first wireless communication device 14. Further, a positive D2D discovery status of the second wireless communication device 16 may indicate that the second wireless communication device 16 is available for D2D communication with the first wireless communication device 14. If the number of positive discovery message detection results D_L1 is less than the desired minimum number of positive discovery message detection results N within the predetermined period of time W the D2D discovery status of the second wireless communication device 16 is negative, which may indicate that the second wireless communication device 16 is not in close proximity to the first wireless communication device 14. Further, a negative D2D discovery status of the second wireless communication device 16 may indicate that the second wireless communication device 16 is not available for D2D communication with the first wireless communication device 14.

In one embodiment, the predetermined period of time W and the desired minimum number of discovery messages N are pre-determined and stored by the first wireless communication device 14. In another embodiment, the predetermined period of time W and the desired minimum number of discovery messages N are configured by the cellular communications network 10 in which the first wireless communication device 14 is located. In this embodiment, the cellular communications network 10 may configure the parameters based on multiple factors such as the speed of various wireless communication devices in the cellular communications network 10 and the amount or type of traffic in the cellular communication network 10. The first wireless communications device 14 may continue to use the parameters configured by the cellular communications network 10, even when the first wireless communication device 14 is out of range of the cellular communication network 10. However, should the parameters configured by the cellular communications network 10 no longer be acceptable or optimal, the first wireless communications device 14 may fall back to pre-determined parameters stored on the first wireless communications device 14.

In one embodiment, the desired minimum number of positive discovery message detection results N and the predetermined period of time W may be changed based upon one or more previously determined D2D discovery statuses of the second wireless communication device 16. That is, the first wireless communication device 14 may increase or decrease the threshold for generating a positive D2D discovery status for the second wireless communication device based on one or more previously determined D2D discovery statuses of the second wireless communication device 16. For example, if the first wireless communication device 14 has previously determined a positive D2D discovery status of the second wireless communication device 16, it may be determined that the reliability of a positive D2D discovery status is higher than if the first wireless communication device 14 had not previously made such a determination. Accordingly, the first wireless communication device may decrease the threshold for generating a positive D2D discovery status for the second wireless communication device 16 by increasing the length of the predetermined time period W, lowering the desired minimum number of positive discovery message detection results N, or both. Further, the values of W and/or the value of N may be a function of the network load (for discovery) and/or wireless communication device mobility of the first wireless communication device 14 and/or the second wireless communication device 16.

In one embodiment, the post-processing performed by the first wireless communication device 14 is different for different formats of discovery messages received by the first wireless communication device 14. For example, if a discovery message detection result obtained by the first wireless communication device 14 indicates that a discovery message having a first format was received from the second wireless communication device 16, the first wireless communication device 14 may perform post-processing as described above. However, if a discovery message detection result obtained by the first wireless communication device 14 indicates that a discovery message having a second format was received from the second wireless communication device 16, the first wireless communication device 14 may bypass one or more post-processing operations.

By determining a D2D discovery status of the second wireless communication device 16 based on multiple discovery message detection results, a more reliable determination can be made regarding whether the second wireless communication device 16 is in close proximity to the first wireless communication device 14 and/or is available for D2D communication with the first wireless communication device 14. Specifically, requiring multiple positive discovery message detection results protects against false detections of the second wireless communication device 16 by the first wireless communication device 14, increasing the likelihood that the first wireless communication device 14 is in close proximity to the second wireless communication device 16 and thus will be able to form a dependable D2D connection with the second wireless communication device 16 upon the determination of a positive D2D discovery status.

Based on the D2D discovery status, a decision is made by the first wireless communication device 14 as to whether to initiate a D2D connection with the second wireless communication device 16 (step 104). The decision by the first wireless communication device 14 as to whether to initiate a D2D connection with the second wireless communication device 16 may occur in, e.g., a higher layer of the protocol stack of the first wireless device 14 than the one in which the D2D discovery status is determined (e.g., in an application layer). In one embodiment, if the D2D discovery status is positive, the first wireless communication device 14 initiates a D2D connection with the second wireless communication device 16 (step 106). However, if the D2D discovery status is negative, the first wireless communication device 14 does not initiate a D2D connection with the second wireless communication device 16, and the process is returned to step 100.

Figure 3:
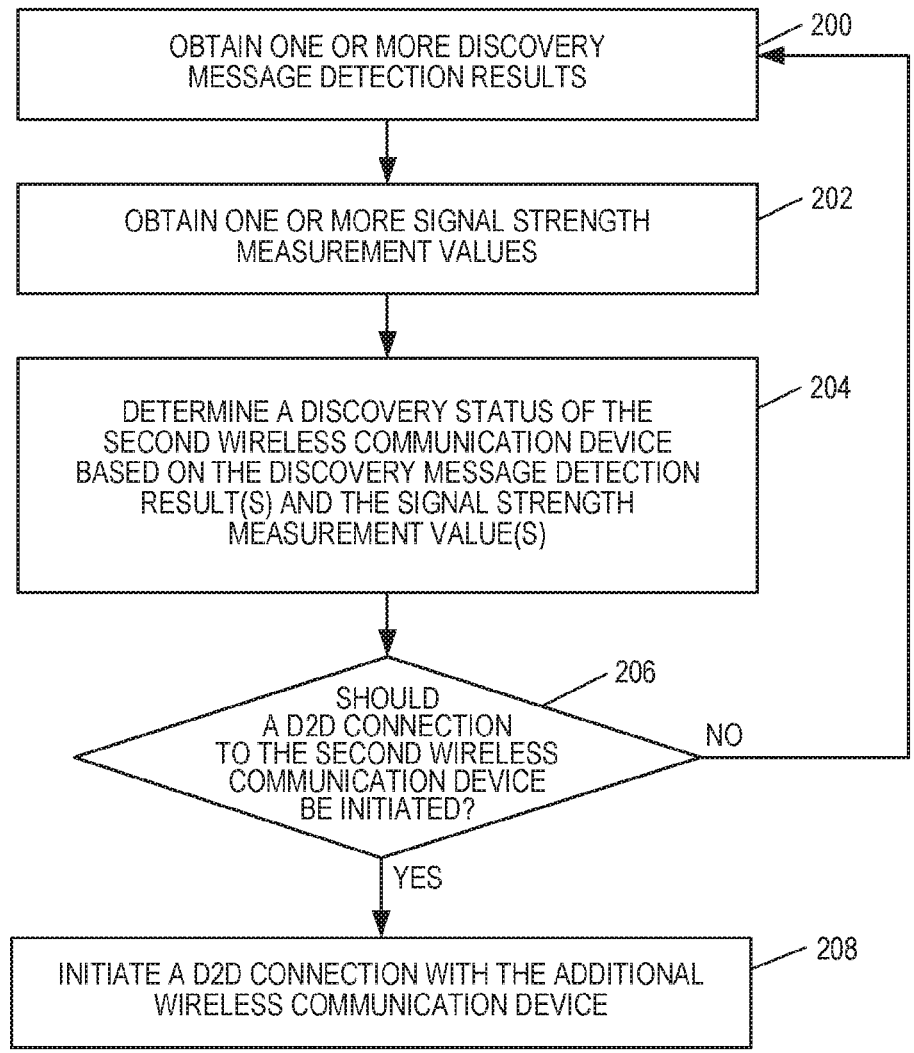
FIG. 3 illustrates a method for reliable discovery of wireless communication devices available for D2D communication according to another embodiment of the present disclosure.

FIG. 3 illustrates a method for performing reliable D2D discovery between wireless communication devices according to another embodiment of the present disclosure. Again, for purposes of illustration, the various steps of the process illustrated in FIG. 3 are discussed as they relate to the first wireless communication device 14 and the second wireless communication device 16 shown in FIG. 1. Those of ordinary skill in the art will appreciate that the method illustrated in FIG. 3 may be performed by any number of different wireless communication devices without departing from the principles herein.

First, one or more discovery message detection results are obtained by the first wireless communication device 14 as discussed above (step 200). In addition, one or more signal strength measurement values are obtained by the first wireless communication device 14 (step 202). In one embodiment, similar to the discovery message detection results, the signal strength measurement values are also obtained in a lower layer (e.g., the L1 or physical layer) of the protocol stack of the first wireless device 14. Each one of the signal strength measurement values indicates the signal strength of a different one of the discovery message detection results. For example, the one or more signal strength measurement values may indicate the signal strength for a corresponding discovery message detection result. The signal strength is a measurement of the signal in which no interference signal is taken into account.

The first wireless communication device 14 then uses one or more of the discovery message detection results and the one or more signal strength measurement values to determine a D2D discovery status of the second wireless communication device 16 (step 204). The D2D discovery status of the second wireless communication device 16 may indicate that the second wireless communication device 16 is in close proximity to the first wireless communication device 14, and may further indicate the availability of the second wireless communication device 16 for D2D communication with the first wireless communication device 14. In one embodiment, a single discovery message detection result and a corresponding signal strength measurement value are used to determine the D2D discovery status of the second wireless communication device 16. In another embodiment, multiple discovery message detection results are used along with one or more corresponding signal strength measurement values to determine the D2D discovery status of the second wireless communication device 16. The determination of the D2D discovery status may occur on a higher layer in the protocol stack of the first wireless communication device 14 than that in which the discovery message detection events were obtained. For example, the determination of the D2D discovery status may be performed in the L2 layer (e.g., as a MAC function) or the L3 layer (e.g., as a RRC function). Further, the D2D discovery status may be reported as an event to an even higher layer in the protocol stack of the first wireless communication device 14 (e.g., an application layer). Using the one or more signal strength measurement values along with one or more of the discovery message detection results allows the first wireless communication device 14 to more reliably ascertain the D2D discovery status of the second wireless communication device 16, as discussed in further detail below.

In one embodiment, the one or more signal strength measurement values are compared to a minimum threshold value in order to determine the D2D discovery status of the second wireless communication device 16. In another embodiment, the discovery message detection results and the signal strength measurement values are post-processed to determine: a) if a minimum number of discovery messages from the second wireless communication device 16 were received by the first wireless communication device 14 in a predetermined period of time, and b) if a filtered signal strength measurement value is above a minimum threshold, as shown in Equations (2) and (3) below:

$$D(t)=D\_L1(t-W)+D\_L1(t-W+1)+ \ldots +D\_L1(t)>=N, \text{ and} \quad (2)$$

$$S\_FILTER(t)>S'$$

where $$S\_FILTER(t)=(1-a)*S\_FILTER(t-1)+a*S(t) \quad (3)$$

where D(t) is the D2D discovery status of the second wireless communication device 16, D_L1 is a discovery message detection result (i.e., 1 or 0 according to whether a device discovery message is detected or not), t is the current time, W is the predetermined period of time, N is the desired minimum number of positive discovery message detection results that should occur before indicating a positive D2D discovery status, S_FILTER(t) is the filtered signal strength measurement value, S is a signal strength measurement value, S' is a desired minimum filtered signal strength measurement value, and a is a constant between 1 and 0.

As shown in Equations (2) and (3), if the number of positive discovery message detection results D_L1 is greater than the desired minimum number of positive discovery message detection results N within the predetermined period of time W and the filtered signal strength measurement value S_FILTER(t) is greater than the desired minimum filtered signal strength measurement value S', the D2D discovery status of the second wireless communication device 16 is positive, which may indicate that the second wireless communication device 16 is in close proximity to the first wireless communication device 14. Further, a positive D2D discovery status of the second wireless communication device 16 may indicate that the second wireless communication device 16 is available for D2D communication with the first wireless communication device 14. If the number of positive discovery message detection results D_L1 is less than the desired minimum number of positive discovery message detection results N within the predetermined period of time W and/or the filtered signal strength measurement value S_FILTER(t) is less than the desired minimum filtered signal strength measurement value S', the D2D discovery status of the second wireless communication device is negative, which may indicate that the second wireless communication device 16 is not in close proximity to the first wireless communication device 14. Further, a negative D2D discovery status of the second wireless communication device 16 may indicate that the second wireless communication device 16 is not available for D2D communication with the first wireless communication device 14. Those of ordinary skill in the art will appreciate that although a recursive filtering function is used to determine the filtered signal strength measurement value S_FILTER(t) in Equation (3), any suitable filtering function may be used without departing from the principles disclosed herein.

In one embodiment, the desired minimum number of positive discovery message detection results N and the predetermined period of time W may be changed based upon one or more previously determined D2D discovery statuses of the second wireless communication device 16, the network load (for discovery), and/or the wireless communication device mobility of the first wireless communication device 14 and/or the second wireless communication device 16.

In one embodiment, the predetermined period of time W, the desired minimum number of discovery messages N, and the desired minimum filtered signal strength measurement S' are pre-determined and stored by the first wireless communication device 14. In another embodiment, the predetermined period of time W, the desired minimum number of discovery messages N, and the desired minimum filtered signal strength measurement S' are configured by the cellular communications network 10 in which the first wireless communication device 14 is located. In this embodiment, the cellular communications network 10 may configure the parameters based on multiple factors such as the speed of various wireless communication devices in the cellular communications network 10 and the amount or type of traffic in the cellular communication network 10. The first wireless communications device 14 may continue to use the parameters configured by the cellular communications network 10, even when the first wireless communication device 14 is out of range of the cellular communication network 10. However, should the parameters configured by the cellular communications network 10 no longer be acceptable or optimal, the first wireless communications device 14 may fall back to pre-determined parameters stored on the first wireless communications device 14.

By determining the D2D discovery status of the second wireless communication device 16 based on one or more of the discovery message detection results and the one or more signal strength measurement values, a more reliable determination can be regarding whether the second wireless communication device 16 is in close proximity to the first wireless communication device 14 and/or is available for D2D communication with the first wireless communication device 14. Specifically, using the one or more signal strength measurement values allows the first wireless communication device 14 to more accurately determine the potential link quality with the second wireless communication device 16 and the distance to the second wireless communication device 16. In one example, a discovery message detection result may be positive, indicating that a discovery message was received from the second wireless communication device 16, however, a signal strength measurement value associated with the discovery message detection result may indicate that the second wireless communication device 16 is nearly out of range of the first wireless communication device 14, or that the link quality will be poor. Accordingly, the first wireless communication device 14 may determine a negative D2D discovery status for the second wireless communication device 16 until the one or more signal strength measurement values improves.

Based on the D2D discovery status, a decision is made by the first wireless communication device 14 whether to initiate a D2D connection with the second wireless communication device 16, as discussed above (step 206). In one embodiment, if the D2D discovery status is positive, the first wireless communication device 14 initiates a D2D connection with the second wireless communication device 16 (step 208). However, if the D2D discovery status is negative, the first wireless communication device 14 does not initiate a D2D connection with the second wireless communication device 16, and the process is returned to step 200.

Figure 4:
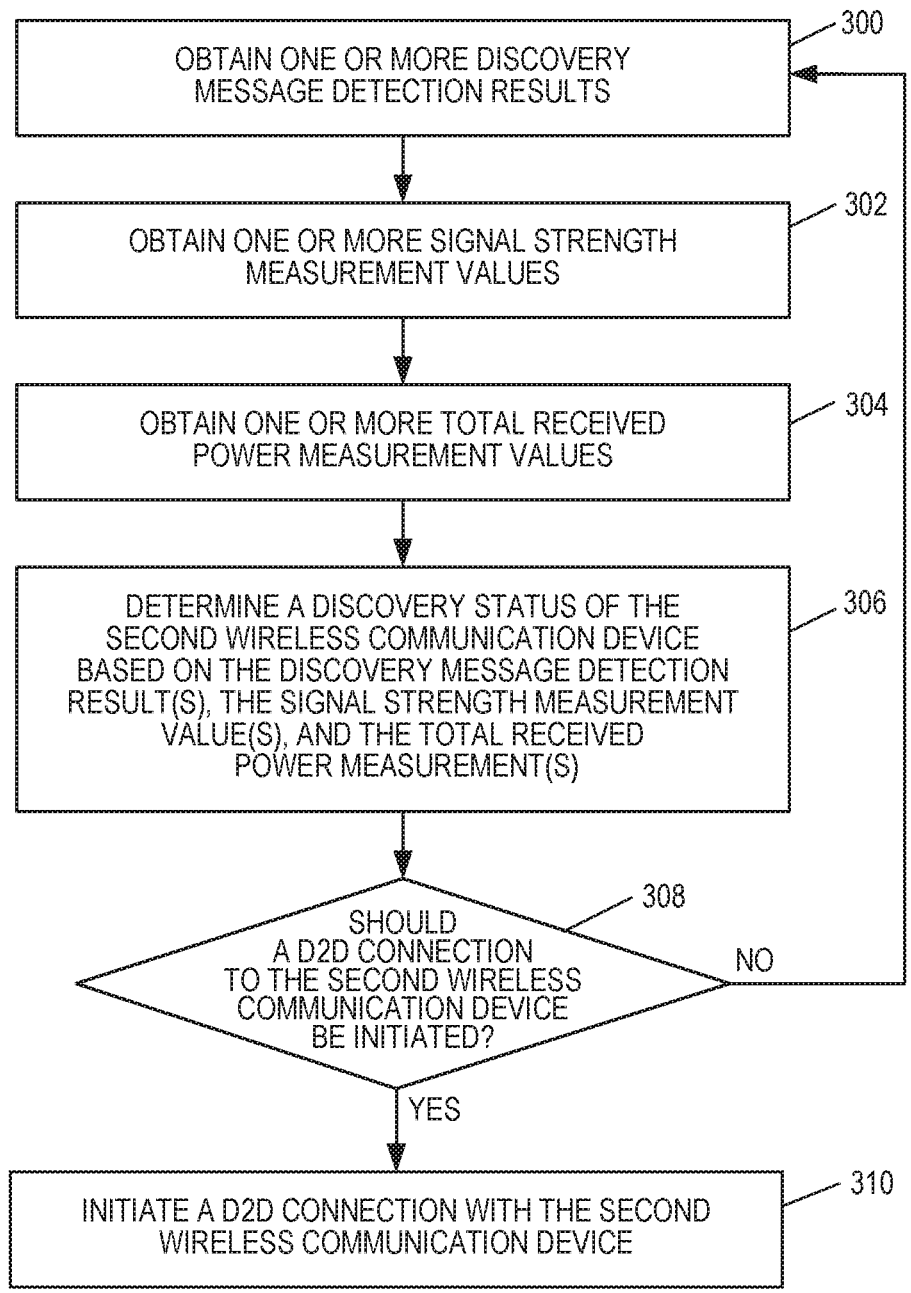
FIG. 4 illustrates a method for reliable discovery of wireless communication devices available for D2D according to another embodiment of the present disclosure.

FIG. 4 illustrates a method for performing reliable D2D discovery between wireless communication devices according to another embodiment of the present disclosure. Again, for purposes of illustration, the various steps of the process illustrated in FIG. 4 are discussed as they relate to the first wireless communication device 14 and the second wireless communication device 16 shown in FIG. 1. Those of ordinary skill in the art will appreciate that the method illustrated in FIG. 4 may be performed by any number of different wireless communication devices without departing from the principles of the present disclosure.

First, one or more discovery message detection results are obtained by the first wireless communication device 14, as discussed above (step 300). One or more signal strength measurement values are also obtained by the first wireless communication device 14, as discussed above (step 302). Still further, one or more total received power measurement values are obtained by the first wireless communication device 14 (step 304). Similar to the discovery message detection results and the signal strength measurement values, the total received power measurement values may also be obtained in a lower layer (e.g., the L1 or physical layer) of the protocol stack of the first wireless communication device 14. Each one of the total received power measurements indicates a total received power of a different one of the discovery message detection results. For example, the one or more total received power measurements may indicate the total received power of a corresponding discovery message detection result. The total received power is a measurement of both the signal and interference.

The first wireless communication device 14 uses one or more of the discovery message detection results, the one or more signal strength measurement values, and the one or more total received power measurements to determine a D2D discovery status of the second wireless communication device 16 (step 306). The D2D discovery status of the second wireless communication device 16 may indicate that the second wireless communication device 16 is in close proximity to the first wireless communication device 14, and may further indicate availability of the second wireless communication device 16 for D2D communication with the first wireless communication device 14. In one embodiment, a single discovery message along with a corresponding signal strength measurement value and a total received power measurement value are used to determine the D2D discovery status of the second wireless communication device 16. In another embodiment, multiple discovery message detection results are used along with one or more corresponding signal strength measurement values and one or more total received power measurement values to determine the D2D discovery status of the second wireless communication device 16. The determination of the D2D discovery status may occur on a higher layer in the protocol stack of the first wireless communication device 14 than that in which the discovery message detection results were obtained. For example, the determination of the D2D discovery status may be performed in the L2 layer (e.g., as a MAC function) or the L3 layer (e.g., as an RRC function). Further, the D2D discovery status may be reported as an event to an even higher layer in the protocol stack of the first wireless communication device 14 (e.g., an application layer). Using the one or more total received power measurement values along with the one or more signal strength measurement values and the one or more discovery message detection results allows the first wireless communication device 14 to more reliably ascertain the D2D discovery status of the second wireless communication device 16, as discussed in further detail.

In one embodiment, multiple discovery message detection results along with multiple corresponding signal strength measurement values and total received measurement values are used. The signal strength measurement values are divided by the corresponding total received power measurement values and compared to a minimum threshold value in order to determine the D2D discovery status of the second wireless communication device. In another embodiment, the discovery message detection results, the signal strength measurement values, and the total received power measurement values are post-processed to determine: a) if a minimum number of discovery messages from the second wireless communication device 16 were received by the first wireless communication device 14 in a predetermined period of time, and b) if a filtered signal strength over total received power measurement value is above a minimum threshold, as shown in Equations (4) and (5) below:

$$D(t)=D\_L1(t-W)+D\_L1(t-W+1)+\ldots+D\_L1(t)>N, \text{ and} \quad (4)$$

$$Q\_FILTER(t)>Q',$$

where $$Q\_FILTER(t)=(1-a)*Q\_FILTER(t-1)+a*S(t)/T(t) \quad (5)$$

where D(t) is the D2D discovery status of the second wireless communication device 16, D_L1 is a discovery message detection result (i.e., 1 or 0 according to whether a device discovery detection message is detected or not), t is the current time, W is the predetermined period of time, N is the desired minimum number of positive discovery message detection results that should occur before indicating a positive D2D discovery status. Q_FILTER(t) is the filtered signal strength over total received power measurement value, S is a signal strength measurement value, T is a total received power measurement value, Q' is a desired minimum filtered signal strength over total received power measurement value, and a is a constant between 1 and 0.

As shown in Equations (4) and (5), if the number of positive discovery message detection results D_L1 is greater than the desired minimum number of positive discovery message detection results N within the predetermined period of time W, and the filtered signal strength over total received power measurement value Q_FILTER(t) is greater than the desired minimum filtered signal strength over total received power measurement value Q', the D2D discovery status of the second wireless communication device 16 is determined as positive, which may indicate that the second wireless communication device 16 is in close proximity to the first wireless communication device 14. Further, a positive D2D discovery status of the second wireless communication device 16 may indicate that the second wireless communication device 16 is available for D2D communication with the first wireless communication device 14. If the number of positive discovery message detection results D_L1 is less than the desired minimum number of positive discovery message detection results N within the predetermined period of time W and/or the filtered signal strength over total received power measurement value Q_FILTER(t) is less than the desired minimum filtered signal strength over total received power measurement value Q', the D2D discovery status of the second wireless communication device 16 is determined as negative, which may indicate that the second wireless communication device 16 is not in close proximity to the first wireless communication device 14. Further, a negative D2D discovery status of the second wireless communication device 16 may indicate that the second wireless communication device 16 is not available for D2D communication with the first wireless communication device 14. Those of ordinary skill in the art will appreciate that although a recursive filtering function is used to determine the filtered signal strength over total received power measurement value Q_FILTER(i) in Equation (5), any suitable filtering function may be used without departing from the principles of the present disclosure.

In one embodiment, the desired minimum number of positive discovery message detection results N and the predetermined period of time W may be changed based upon one or more previously determined D2D discovery statuses of the second wireless communication device 16, the network load (for discovery), and/or the wireless communication device mobility of the first wireless communication device 14 and/or the second wireless communication device 16.

In one embodiment, the predetermined period of time W, the desired minimum number of discovery messages N, and the desired minimum filtered signal strength over total received power measurement value Q' are pre-determined and stored by the first wireless communication device 14. In another embodiment, the predetermined period of time W, the desired minimum number of discovery messages N, and the desired minimum filtered signal strength over total received power measurement value Q' are configured by the cellular communications network 10 in which the first wireless communication device 14 is located. In this embodiment, the cellular communications network 10 may configure the parameters based on multiple factors such as the speed of various wireless communication devices in the cellular communications network 10 and the amount or type of traffic in the cellular communication network 10. The first wireless communications device 14 may continue to use the parameters configured by the cellular communications network 10, even when the first wireless communication device 14 is out of range of the cellular communication network 10. However, should the parameters configured by the cellular communications network 10 no longer be acceptable or optimal, the first wireless communications device 14 may fall back to pre-determined parameters stored on the first wireless communications device 14.

By determining the D2D discovery status of the second wireless communication device 16 based on one or more of the discovery message detection results, the one or more signal strength measurement values, and the one or more total received power measurement values, a more reliable determination can be made regarding whether the second wireless communication device 16 is in close proximity to the first wireless communication device 14 and/or is available for D2D communication with the first wireless communication device 14. Specifically, using the one or more signal strength measurements and the one or more total received power measurements allows the first wireless communication device 14 to more accurately determine the potential link quality with the second wireless communication device 16 and the distance to the second wireless communication device 16. In one example, a discovery message detection result may be positive, indicating that a discovery message was received from the second wireless communication device 16, however a signal strength measurement value and a total received measurement value associated with the discovery message detection result may indicate that the second wireless communication device 16 is nearly out of range of the first wireless communication device 14, or that the link quality will be poor. Accordingly, the first wireless communication device 14 may determine a negative D2D discovery status for the second wireless communication device 16 until the one or more signal strength values or the one or more total received power values improves.

Based on the D2D discovery status, a decision is made by the first wireless communication device 14 whether to initiate a D2D connection with the second wireless communication device 16, as discussed above (step 308). In one embodiment, if the D2D discovery status is positive, the first wireless communication device 14 initiates a D2D connection with the second wireless communication device 16 (step 310). However, if the D2D discovery status is negative, the first wireless communication device 14 does not initiate a D2D connection with the second wireless communication device 16, and the process is returned to step 300.

Figure 5:
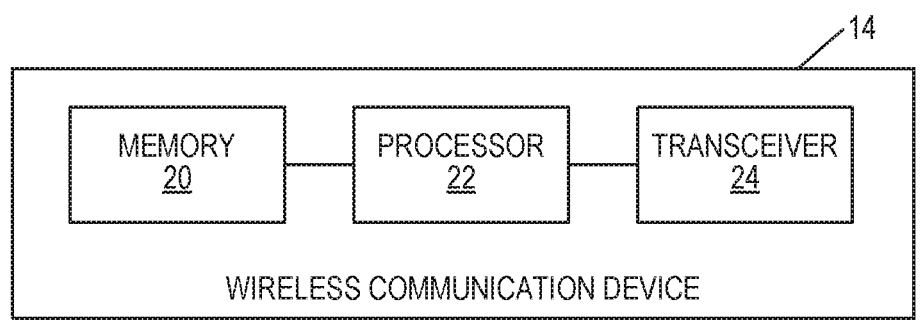
FIG. 5 is a block diagram of one example of a wireless communication device according to one embodiment of the present disclosure.

FIG. 5 shows details of the first wireless communication device 14 according to one embodiment of the present disclosure. As shown in FIG. 5, the first wireless communication device 14 includes a memory 20, a processor, 22, and a transceiver 24. The memory 20 may store instructions, which are executable by the processor 22 such that the first wireless communication device 14 is operable to perform any of the D2D discovery processes described above with respect to FIGS. 2-4. The processor 22 may obtain the discovery message detection results, the signal strength measurement values, and the total received power measurement values using the transceiver 24.

In one embodiment, a computer program comprising instructions which, when executed on at least one processor, cause the at least one processor to carry out any one of the embodiments of the D2D discovery processes described above, is provided. In another embodiment, a carrier containing the compute program is provided, wherein the carrier is one of an electronic signal, an optical signal, a radio signal, or a computer readable storage medium (e.g., a non-transitory computer readable medium).

Figure 6:
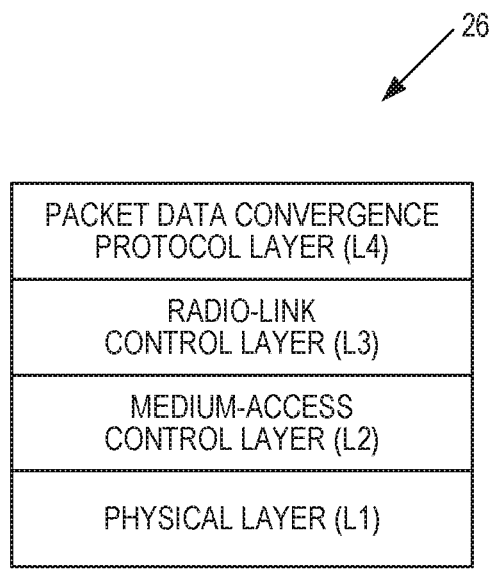
FIG. 6 is a block diagram of one example of a wireless communication device according to another embodiment of the present disclosure.

As will be appreciated by those of ordinary skill in the art, the various functions performed h/de first wireless communication device 14 may be partitioned into a number of abstraction layers of a protocol stack. FIG. 6 shows an exemplary protocol stack 26 for the first wireless communication device 14, wherein the protocol stack 26 conforms to 3GPP Long Term Evolution (LTE) standards. As shown in FIG. 6, the protocol stack 26 includes a physical layer (L1), a medium-access control layer (L2), a radio-link control layer (L3), and a packet data convergence protocol layer (L4). Those of ordinary skill in the art will appreciate that additional layers (e.g., one or more application layers) may be included in the protocol stack 26 associated with the first wireless communication device 14 without departing from the principles of the present disclosure. Generally, the physical layer (L1) handles coding and decoding, including modulation and demodulation of signals transmitted and received from the first wireless communication device 14, multi-antenna mapping, and other typical physical layer functions, as will be appreciated by those of ordinary skill in the art. The physical layer (L1) generally offers services to the medium-access control layer (L2) in the form of transport channels. The medium-access control layer (L2) generally handles multiplexing, data redundancy retransmissions, and uplink and downlink scheduling. The medium-access control layer (L2) offers services to the radio-link control layer (L3) in the form of logical channels. The radio-link control layer (L3) generally handles segmentation/concatenation of data, retransmissions, duplicate detection, and in-sequence delivery to higher layers. The radio-link control layer (L3) offers services to the packet data convergence protocol layer (L4) in the form of radio bearers. Finally, the packet data convergence protocol layer (L4) performs data compression to reduce the amount of data to be transmitted over the radio interface associated with the first wireless communication device 14.

As discussed above, the various steps of the processes illustrated in FIGS. 2-4 may be performed at different layers of the protocol stack 26 in the first wireless communication device 14. Specifically, the discovery message detection results, the signal strength measurement values, and the total received power measurement values may be obtained at the physical layer (L1). The D2D discovery status may be determined at the medium-access control layer (L2), the radio-link control layer (L3), or the packet data convergence protocol layer (L4), and may report the determined D2D discovery status to a higher layer. Finally, the decision whether to initiate a D2D connection with another wireless communication device may be determined at the radio-link control layer (L3), the packet data convergence protocol layer (L4), or a higher layer (e.g., an application layer).

Figure 7:
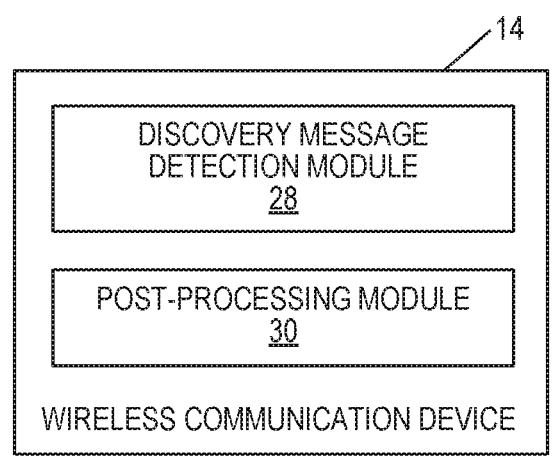
FIG. 7 is a block diagram of one example of a wireless communication device according to another embodiment of the present disclosure.

FIG. 7 shows details of the first wireless communication device 14 according to another embodiment of the present disclosure. As shown in FIG. 7, the first wireless communication device 14 includes a detection module 28 and a post-processing module 30. The detection module 28 may be configured to obtain the discovery message detection results, the signal strength measurement values, and the total received power measurement values as discussed above with respect to the processes illustrated in FIGS. 2-4. The post-processing module 30 may be configured to determine the D2D status based on one or more of the discovery message detection results, the signal strength measurement values, and the total received power measurement values, as discussed above with respect to the processes illustrated in FIGS. 2-4.

The following acronyms are used throughout this disclosure.

3GPP 3$^{rd}$ Generation Partnership Project
D2D Device-to-Device
eNB Enhanced Node B
LTE Long Term Evolution Those skilled in the art will recognize improvements and modifications to the embodiments of the present disclosure. All such improvements and modifications are considered within the scope of the concepts disclosed herein and the claims that follow.

What is claimed is:

1. A method of operating a first wireless communication device to perform device-to-device, D2D, detection, comprising:
    obtaining a plurality of discovery message detection results; and
    determining a D2D discovery status of a second wireless device based on the plurality of discovery message detection results, and initiating a D2D connection with the second wireless communication device based on the determined D2D discovery status,
    wherein determining the D2D discovery status of the second wireless communication device is further based on at least one of a group consisting of:
    one or more signal strength measurement values, each associated with a different one of the plurality of discovery message detection results; and
    one or more total received power measurement values, each associated with a different one of the plurality of discovery message detection results, and wherein determining the D2D discovery status of the second wireless communication device is further based on at least one of a group consisting of:
a filtered signal strength value determined based on the one or more signal strength measurement values; and
a filtered total received power value determined based on the one or more total received power measurement values.

2. The method of claim 1 wherein:
obtaining the plurality of discovery message detection results comprises obtaining the plurality of discovery message detection results at a first layer within a protocol stack of the first wireless communication device; and
determining the D2D discovery status of the second wireless communication device comprises post-processing the plurality of discovery message detection results within a second layer within the protocol stack of the first wireless communication device, which is a higher layer than the first layer.

3. The method of claim 2 wherein the first layer is an L1 layer, and the second layer is one of a group consisting of an L2 layer and a media access control layer.

4. The method of claim 1 wherein the D2D discovery status of the second wireless device is further based on a previously determined D2D discovery status of the second wireless communication device.

5. The method of claim 1 wherein determining the D2D discovery status of the second wireless communication device comprises determining, based on the plurality of discovery message detection results, if a minimum number of discovery messages from the second wireless communication device were detected by the first wireless communication device in a predetermined time period.

6. The method of claim 5 wherein the minimum number of discovery messages and the predetermined time period are based on the previously determined D2D discovery status of the second wireless communication device.

7. The method of claim 1 wherein determining the D2D discovery status of the second wireless communication device is further based on a format of a discovery message received by the first wireless communication device from the second wireless communication device.

8. The method of claim 1 wherein:
the filtered signal strength value is the result of a recursive filtering function including the one or more signal strength measurement values as inputs; and
the filtered total received power value is the result of a recursive filtering function including the one or more total received power measurement values as inputs.

9. A first wireless communication device comprising:
a wireless transceiver;
a processor; and
a memory containing instructions that are executable by the processor whereby the first wireless communication device is operable to obtain a plurality of discovery message detection results using the wireless transceiver and determine a D2D, device-to-device, discovery status of a second wireless communication device based on the plurality of discovery message detection results, and initiating a D2D connection with the second wireless communication device based on the determined D2D discovery status,
wherein determining the D2D discovery status of the second wireless communication device is further based on at least one of a group consisting of:
one or more signal strength measurement values, each associated with a different one of the plurality of discovery message detection results; and
one or more total received power measurement values, each associated with a different one of the plurality of discovery message detection results, and
wherein determining the D2D discovery status of the second wireless communication device is further based on at least one of a group consisting of:
a filtered signal strength value determined based on the one or more signal strength measurement values; and
a filtered total received power value determined based on the one or more total received power measurement values.

10. The first wireless communication device of claim 9 wherein:
obtaining the plurality of discovery message detection results comprises obtaining the plurality of discovery message detection results at a first layer within a protocol stack of the first wireless communication device; and
determining the D2D discovery status of the second wireless communication device-comprises post-processing the plurality of discovery message detection results within a second layer within the protocol stack of the first wireless communication device.

11. The first wireless communication device of claim 9 wherein the first layer is an L1 layer, and the second layer is one of a group consisting of an L2 layer and a media access control layer.

12. The first wireless communication device of claim 9 wherein determining the D2D discovery status of the second wireless communication device comprises determining, based on the plurality of discovery message detection results, if a minimum number of discovery messages from the second wireless communication device were detected by the first wireless communication device in a predetermined time period.

13. The first wireless communication device of claim 9 wherein:
the filtered signal strength value is the result of a recursive filtering function including the one or more signal strength measurement values as inputs; and
the filtered total received power value is the result of a recursive filtering function including the one or more total received power measurement values as inputs.

* * * * *